United States Patent [19]

Hills et al.

[11] Patent Number: 5,510,864
[45] Date of Patent: Apr. 23, 1996

[54] CAMERA WITH FILM RECORDING MODULE

[75] Inventors: Robert G. Hills, Spencerport; Craig A. Baker, Marion, both of N.Y.

[73] Assignee: Eastman Kodak Company, Rochester, N.Y.

[21] Appl. No.: 403,319

[22] Filed: Mar. 14, 1995

[51] Int. Cl.⁶ .................................................. G03B 17/24
[52] U.S. Cl. .................................................. 354/106; 360/1
[58] Field of Search .................................. 354/75, 76, 105, 354/106; 352/27, 29, 30; 360/1, 3

[56] References Cited

U.S. PATENT DOCUMENTS

| | | | |
|---|---|---|---|
| 3,902,797 | 9/1975 | Thomas | 352/29 |
| 5,005,031 | 4/1991 | Kelbe | 354/106 |
| 5,016,030 | 5/1991 | Dwyer et al. | 354/106 |
| 5,028,940 | 7/1991 | Pearson | 354/105 X |
| 5,034,836 | 7/1991 | DeMarti, Jr. et al. | 360/3 X |
| 5,264,979 | 11/1993 | Schandl et al. | 360/109 |
| 5,272,498 | 12/1993 | Wakabayashi | 354/105 |
| 5,285,325 | 2/1994 | Kiesow | 360/3 |
| 5,321,452 | 6/1994 | Tsujimoto | 354/106 |
| 5,448,321 | 9/1995 | Matsukawa | 354/106 |

*Primary Examiner*—A. A. Mathews
*Attorney, Agent, or Firm*—Peter J. Bilinski

[57] ABSTRACT

A still camera includes a frame defining a planar film path and resiliently supporting a magnetic head module urged into engagement with an edge of an associated film on which magnetically recorded information is to be applied. The module includes a head carriage restrained against longitudinal motion and carrying a pressure pad in opposed relation to a recording head mounted on a spring beam of the carriage so as to urge the head against a film backed by the pressure pad. The head module may be formed as a preassembled subassembly. A leaf spring supported by a tab held in the camera frame urges the module against the film edge.

5 Claims, 4 Drawing Sheets

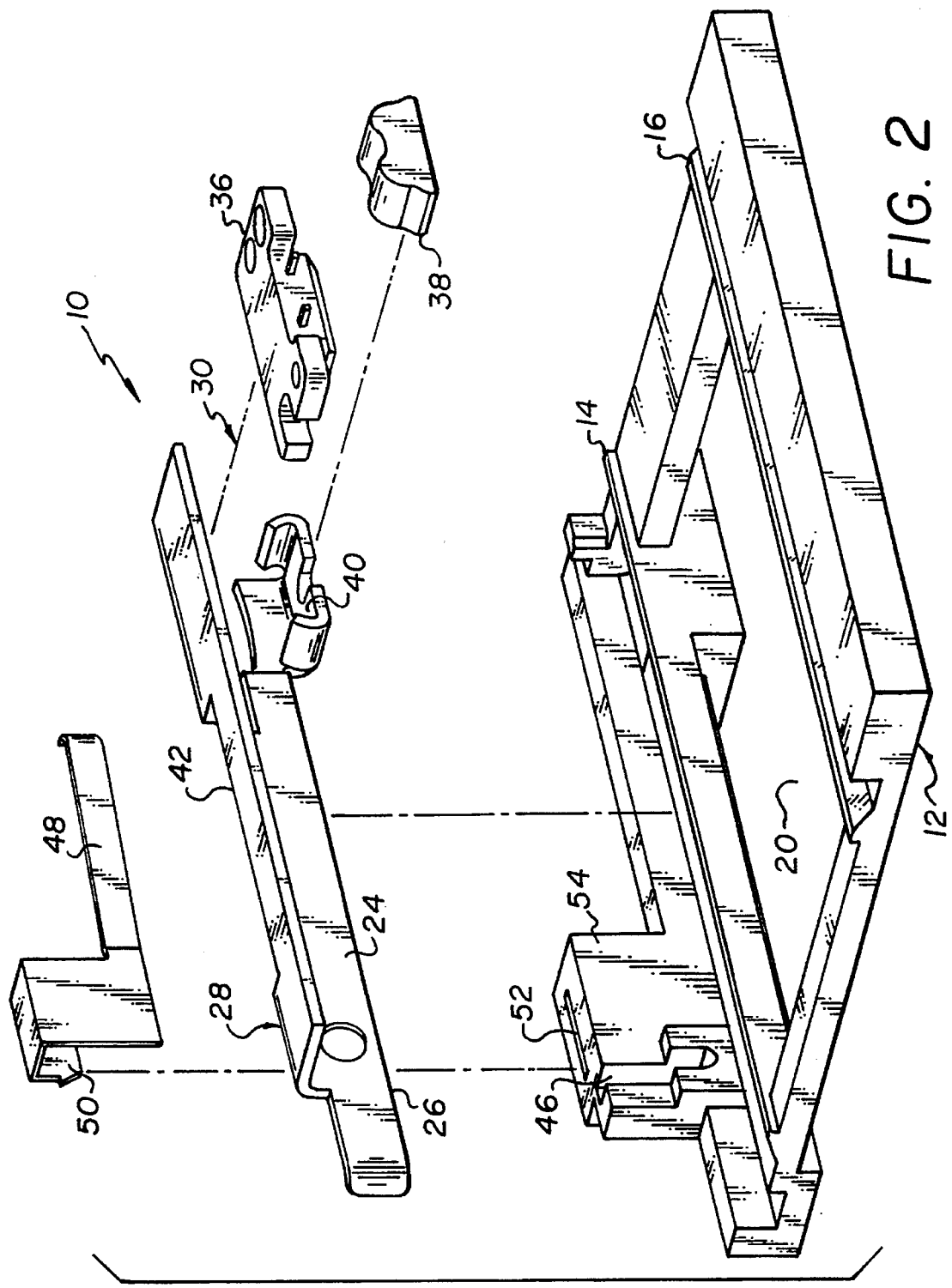

CAMERA WITH FILM RECORDING MODULE

FIELD OF THE INVENTION

This invention relates to magnetic recording apparatus for cameras and in particular to magnetic recording apparatus for photographic still cameras.

BACKGROUND OF THE INVENTION

It is known in the art relating to magnetic film recording apparatus for still cameras to provide a partially floating carriage for holding a recording head and film supporting pressure pad to maintain alignment of the magnetic head recording track(s) with the edge of a film on which information is to be recorded. U.S. Pat. No. 5,028,940 issued Jul. 2, 1991 to the assignee of the present invention shows such an arrangement wherein a head carriage module is supported by a platen which guidingly engages the back of film passing through a film gate. The module is made up of an assembly of several elements which, together with mounting on the platen, complicates the assembly and required tolerances of the mechanism.

SUMMARY OF THE INVENTION

The present invention provides a camera having a simplified magnetic head module that is supported directly by the camera frame adjacent to a film gate. The module includes a head carriage having an edge wall and means supporting a pressure pad and a magnetic head opposing the pressure pad for engagement with the film between the pad and head for recording adjacent the edge of the film.

The head is preferably mounted on a portion of the carriage formed as a spring beam to bias the head into engagement with the film supported by the pressure pad. Restraining means for the carriage prevent longitudinal travel in the direction of film motion but allow limited movement in other directions. A pin on the carriage engaging a slot in the camera frame extending normal to the plane of the film surface provides the desired restraint.

A leaf spring supported by a tab received in a recess in the camera frame engages the outer side of the edge wall urging the wall toward the film to maintain a constant engagement with the film edge so as to maintain a precise location of the module and the magnetic recording tracks of the head from the edge of the film. The arrangement of the module components allows the module to be manufactured as a subassembly for ease of manufacturing and testing.

These and other features and advantages of the invention will be more fully understood from the following detailed description of the invention taken together with the accompanying drawings.

BRIEF DESCRIPTION OF THE DRAWINGS

In the drawings:

FIG. 2 is an exploded pictorial view of the camera film gate assembly of FIG. 1 with the film and platen deleted for clarity;

DETAILED DESCRIPTION OF THE INVENTION

Figure 1:
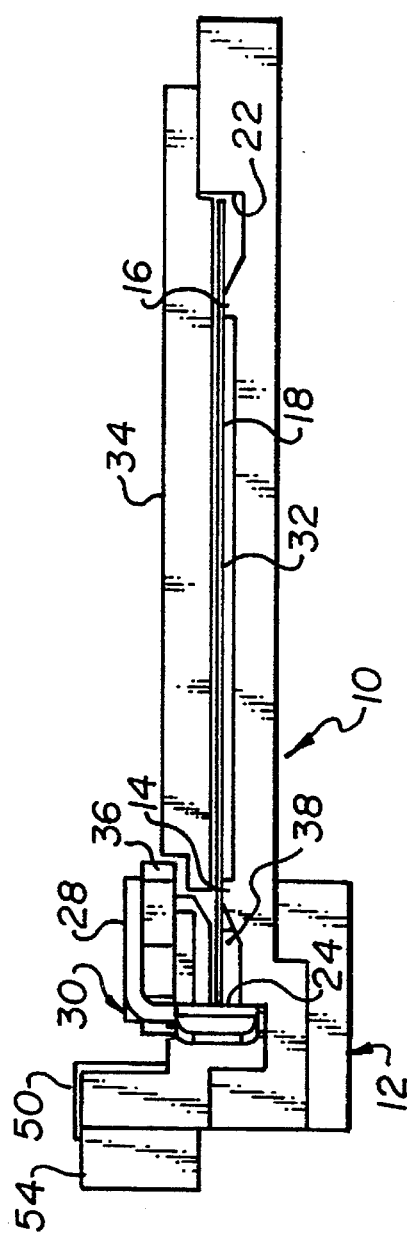
FIG. 1 has a cross-sectional view of the film gate portion of a still camera formed according to the invention.
Figure 3:
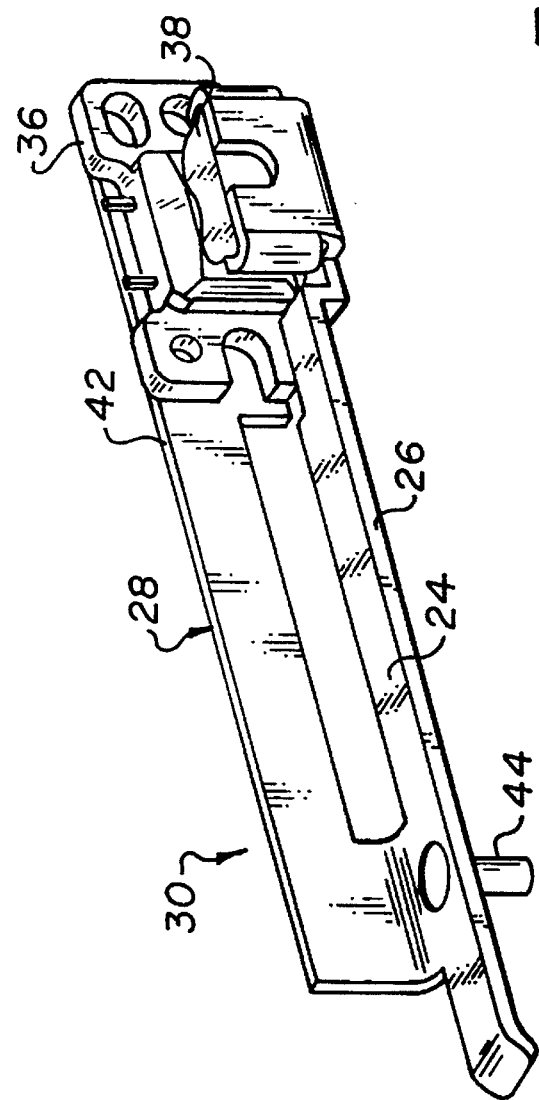
FIG. 3 is a pictorial view of the magnetic recording module for the camera of FIGS. 1 and 2.
Figure 4:
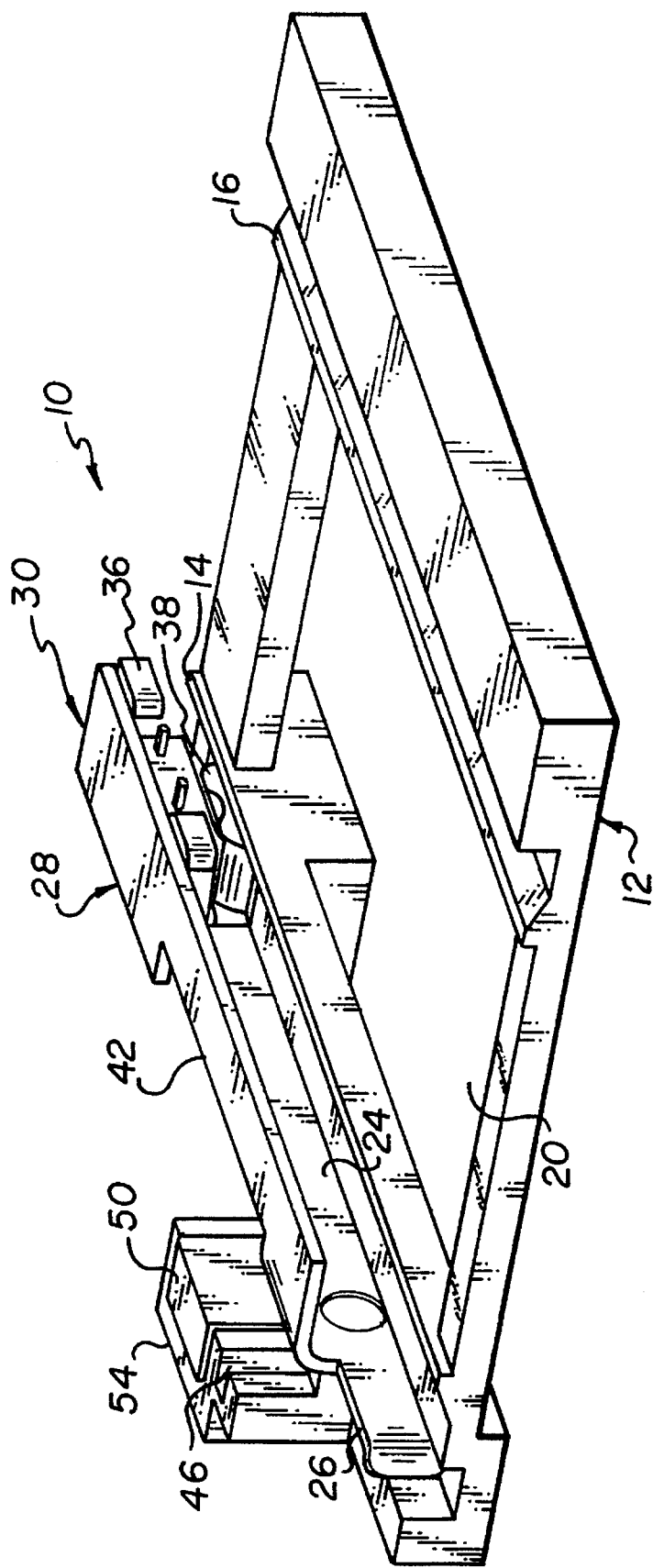
FIG. 4 is a pictorial view similar to FIG. 2 but showing the components in assembly as viewed from the inner side of the recording module.
Figure 5:
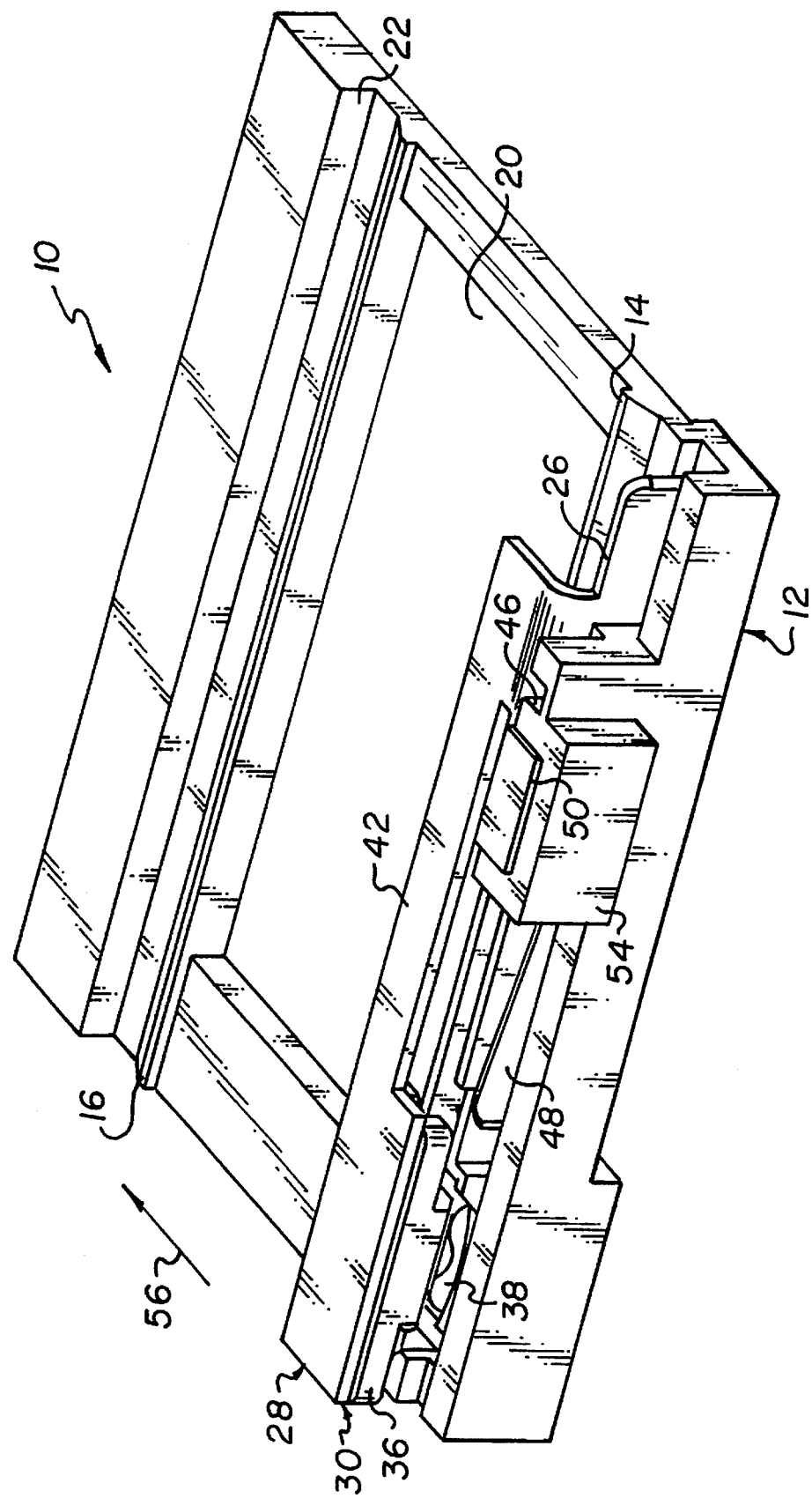
FIG. 5 is a pictorial view of the assembly of FIG. 4 as viewed from the outer side of the recording module.

Referring now to FIGS. 1–5 of the drawings in detail, numeral 10 generally indicates a still camera and, in particular, the film gate portion of a camera having a frame 12 including a pair of spaced longitudinal rails 14, 16. The rails define a plane 18 for film travel across an optical opening 20, through which lens focused images may be applied to film lying in a film path defined by the plane 18. Outward of the rail 16, the frame defines a fixed longitudinal edge wall 22 which borders one edge of the film path. The opposite edge is defined by the inner face 24 of a movable edge wall 26 forming part of a carriage 28 for a magnetic head module generally indicated by numeral 30. A strip of photographic film 32, movable through the film path by conventional means not shown, is engaged by a film platen 34 that is resiliently biased, by means not shown, against the frame 12 for maintaining it in a generally flat configuration lying along the plane 18 against or adjacent the rails 14, 16.

The module 30 is made up of the carriage 28, a magnetic recording head 36 and a pressure pad 38. The edge wall 26 of the carriage supports at one end a formed recess 40 in which the pressure pad 38 is received. At its other end, the wall 26 supports a spring beam 42 extending parallel with and generally normal to the wall 26 to a position opposite the recess 40. At this location, the recording head 36 is fixed to the spring beam 42. In assembly, the beam 42 is slightly deflected so as to urge the recording head toward, or against, the pressure pad 38.

A post 44 extends outward from the edge wall 26 on the side opposite the film engaging face 24. The post 44 is received in a slot 46 extending in the frame 12 normal to the plane 18 of the film path through the gate and open in the direction toward the film. When module 30 is assembled to the camera frame, the post 44 lying in the slot 46 restrains the module against longitudinal motion in the direction of film travel while allowing limited motion in the normal and lateral directions relative to the plane 18 of the film.

The module 30 is so positioned that the interface between the recording head 36 and the pressure pad 38 lies inwardly adjacent to the edge of the film 32 on its film path through the gate so that the edge of the film outward of rail 14 passes between the pressure pad and the recording head in engagement with both. A leaf spring 48 is supported by a tab 50 in biasing engagement with the back of the edge wall 26 of module 30. The supporting tab 50 is received in a slot-like recess 52 in a raised support portion 54 of the camera frame 12. The spring 48 biases the carriage and module assembly inwardly so that the face 24 of the edge wall 26 is maintained in engagement with an associated edge of the film 32. This maintains a fixed relationship between the film edge and the recording head tracks, thus keeping information recorded on the film by the recording head 36 in fixed relation with the associated edge of the film.

In operation, the complete head module assembly 30 is urged in the direction of the arrow 56 (FIG. 5) toward the opposite fixed edge wall 22 of the film path so that the module is maintained in engagement with the adjacent edge of the film 32 to fix the relations of the recording head 36 and the film edge. The resilient action of the spring beam 42 maintains the recording head 36 in engagement with the magnetically treated edge of the film so that, when the film is advanced through the film gate, information may be magnetically recorded on the film during this motion. The film recording head module 30 is restrained by the post 44 and slot 46 against longitudinal motion in the direction of film travel but is free to move as required in the direction normal to the plane of the film as well as lateral thereto. By this means the critical location of the head with respect to the film is self-adjusting and automatically compensated by the floating head carriage.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

PARTS LIST 10. camera
12. frame
14. rail
16. rail
18. plane
20. optical opening
22. fixed edge wall
24. inner face
26. edge wall
28. carriage
30. magnetic head module
32. film
34. film platen
36. magnetic recording
38. pressure pad
40. recess
42. spring beam
post
46. slot
48. leaf spring
50. tab
52. recess
54. support portion
56. arrow
58.
60.
62.
64.
66.
68.
70.
72.
74.
76.
78.
80.
82. head 84.
86.
88.
90.
92.
94.
96.
98.
100.

What is claimed is:

1. A camera including a frame defining a film gate having a fixed longitudinal edge wall defining one edge of a path for film travel through the gate and a magnetic head module defining an opposite edge of said film travel path, a pair of spaced longitudinal rails disposed between said edges and defining a plane for film travel and an optical opening for application of images to film lying in said plane, said camera characterized by:

said module including a carriage mounted on the frame and having a wall defining said opposite edge of the film travel path, the carriage mounting restraining the module against longitudinal movement in the direction of film travel but allowing limited motion in directions lateral and normal to said plane;

a magnetic head and a pressure pad mounted on said carriage in opposed relation and positioned to engage a film in said film path on opposite sides of and adjacent an edge of the film outward of the adjacent plane defining rail, said head being adapted to apply magnetic information to the film adjacent said film edge; and spring means acting between said carriage and said frame and urging said carriage wall against said film edge for maintaining a precise relation of said head with said film edge.

2. A camera as in claim 1 characterized in that said magnetic head is mounted to a resilient beam forming a part of said carriage, said beam urging said head toward said pressure pad and against said edge of a film positioned in said film path.

3. A camera as in claim 1 characterized in that said carriage includes a post protruding from said carriage wall into a groove in said frame, said groove being open toward said wall and extending normal to said plane to accomplish said longitudinal restraint of the carriage while permitting free motion in other directions.

4. A camera as in claim 1 characterized in that said spring means is a leaf spring having an integral tab received in a recess in said frame and positioning said spring in resilient engagement with said carriage wall.

5. A camera as in claim 1 characterized in that said module may be made as a pre-assembled subassembly for testing of its operation prior to installation in said camera.

* * * * *